(No Model.)
G. P. BUMP.
ROTARY ENGINE.
No. 581,265. Patented Apr. 27, 1897.
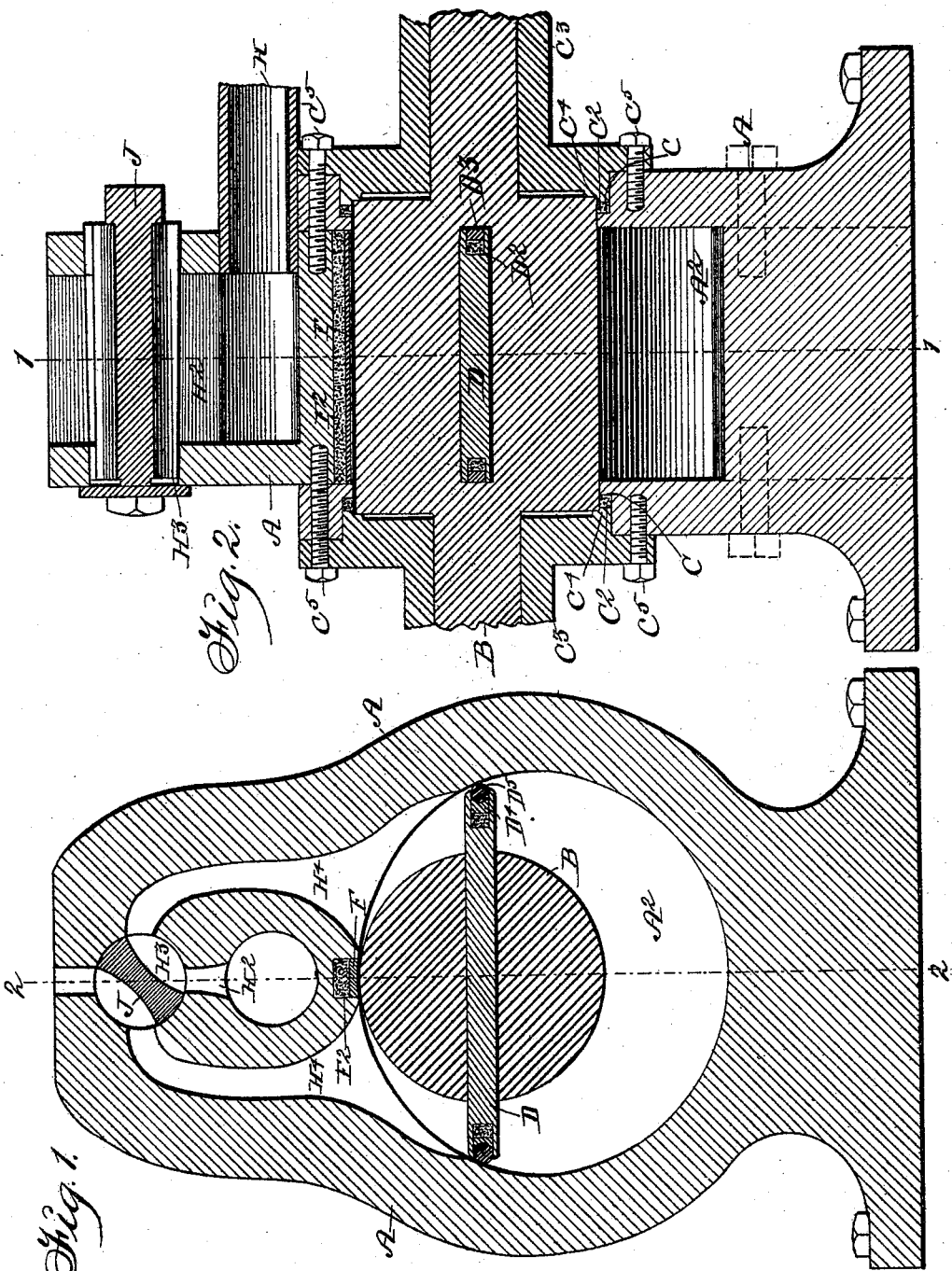
Witnesses:
R. S. Orwig,
S. C. Sweet.
Inventor: George P. Bump,
By Thomas G. and J. Ralph Orwig,
Attorneys.

United States Patent Office.

GEORGE P. BUMP, OF LYNNEVILLE, IOWA.

ROTARY ENGINE.

SPECIFICATION forming part of Letters Patent No. 581,265, dated April 27, 1897.

Application filed July 10, 1896. Serial No. 598,768. (No model.)

*To all whom it may concern:*

Be it known that I, GEORGE P. BUMP, a citizen of the United States of America, residing at Lynneville, in the county of Jasper and State of Iowa, have invented certain new and useful Improvements in Rotary Engines, of which the following is a specification.

The object of this invention is primarily to provide an engine in which the parts are all of cheap, simple, and durable construction and easily assembled, and, further, to provide an engine in which wear is reduced to a minimum and automatically compensated for.

My invention consists in certain details in the construction of the cylinder, hub, and piston and their relative arrangement and combination, as hereinafter set forth, pointed out in my claim, and illustrated in the accompanying drawings, in which—

Figure 1 shows a vertical section taken through the line 1 1 of Fig. 2, and Fig. 2 shows a vertical section at right angles to the first through the line 2 2 of Fig. 1.

Referring to the accompanying drawings, the reference-letter A is used to indicate the engine-frame, provided with a central chamber $A^2$, designed to admit a cylindrical hub B. This hub is mounted to engage the top of the chamber and the said chamber is varied so much from a true cylinder that a line of a given length passed centrally through the hub will engage the cylinder at both ends at all times during the rotation of the hub. The hub is made of somewhat greater length than the interior of the chamber, and an annular shoulder C is formed in each end of the frame A, concentric with the opening in which the hub rotates, and a packing-ring $C^2$ is seated on the shoulder. A head $C^3$, having an annular projection $C^4$, designed to overlap the end of the hub and engage the packing-ring, is secured to each end of the cylinder by bolts $C^5$. This, it is obvious, prevents the escape of steam around the ends of the hub.

The piston D is composed of a rectangular piece of metal, having an annular groove around its edges in which the packing $D^2$ is placed. At its sides the flat bars $D^3$ are also inserted in said groove to rest on the packing and engage the sides of the opening on the hub through which the piston is passed, and at the ends of the piston the bars $D^4$ are inserted in the grooves and provided with a concaved outer surface to admit a soft-metal roller $D^5$, which is so arranged that less than half of its surface projects beyond the end of the piston. This, it is obvious, will reduce the friction and wear on the piston and cylinder quite materially, and when the rollers are made of soft metal and the cylinder of hardened iron nearly all of the wear will be upon the roller, which may be easily replaced, and not upon the cylinder.

F indicates a stop extended longitudinally of the chamber at its top to engage the top of the hub. A strip of packing $F^2$ is placed in the groove above the stop to force it downwardly.

The motion of the engine is controlled by means of a four-way valve located at the top of the cylinder and comprising a steam-induction pipe H, a passage $H^2$, leading to a chamber $H^3$, having four openings at its top, bottom, and sides, and passages $H^4$, leading from its sides to the interior of the chamber, and an eduction-opening leading from its top. These passages $H^4$ are widened at their lower ends. Their inner edges reach the strip T, and their outer edges are so far separated that one end of the piston will pass the edge of the exhaust-opening as soon as the other end passes beyond the inflow-opening, thus preventing back pressure and cushioning. The valve J is placed in this chamber $H^3$ and may be turned to wholly or partially shut off the supply of steam or reverse the direction of its flow through the cylinder, as will be readily seen by referring to Fig. 1.

In a general operation the engine is of the usual kind. Hence a detailed description of its movements is omitted.

Having thus described my invention, what I claim as new therein, and desire to secure by Letters Patent of the United States, is—

A rotary steam-engine comprising the frame A having a chamber $A^2$ shaped as set forth, ports of ingress and egress $H^4$ at the top thereof, a stop F between said ports, a cylindrical hub B passed through the top of the chamber with its ends projecting beyond the chamber, a head detachably secured to each end of the frame and having an opening to admit the hub, a shoulder C adjacent to said opening, a packing-ring $C^2$ therein, a head $C^3$ for each end of the cylinder, having a projection $C^4$ to engage said packing-ring, screws for clamping said heads $C^3$ to the aforesaid heads and thus providing for the adjustment of the packing-rings, a piston in said hub, and a two-way valve to control the admission of steam to the induction and exhaust ports, substantially as and for the purposes stated.

GEORGE P. BUMP.

Witnesses:
 E. B. MACY,
 C. O. MACY.